Figure 2A:
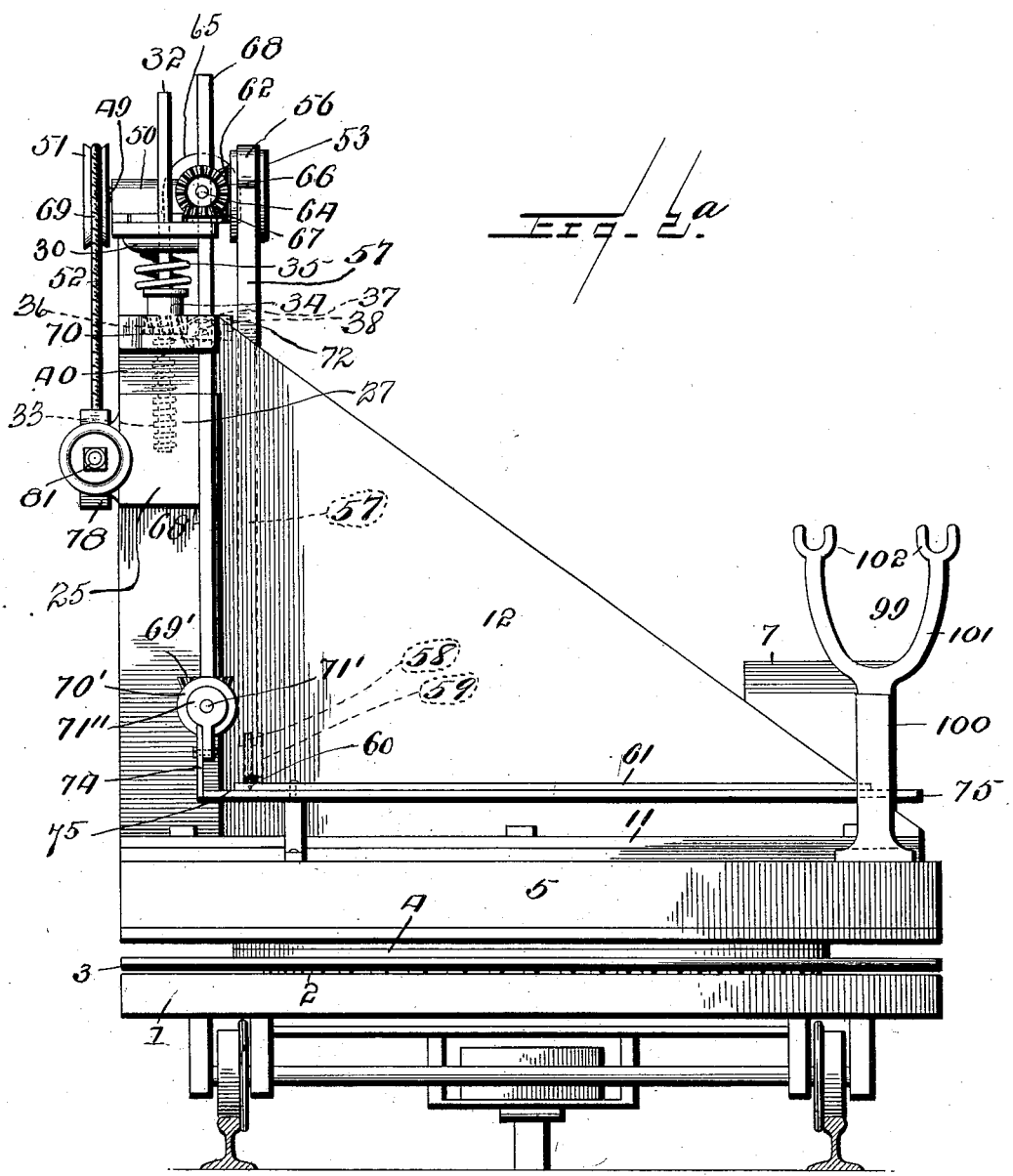

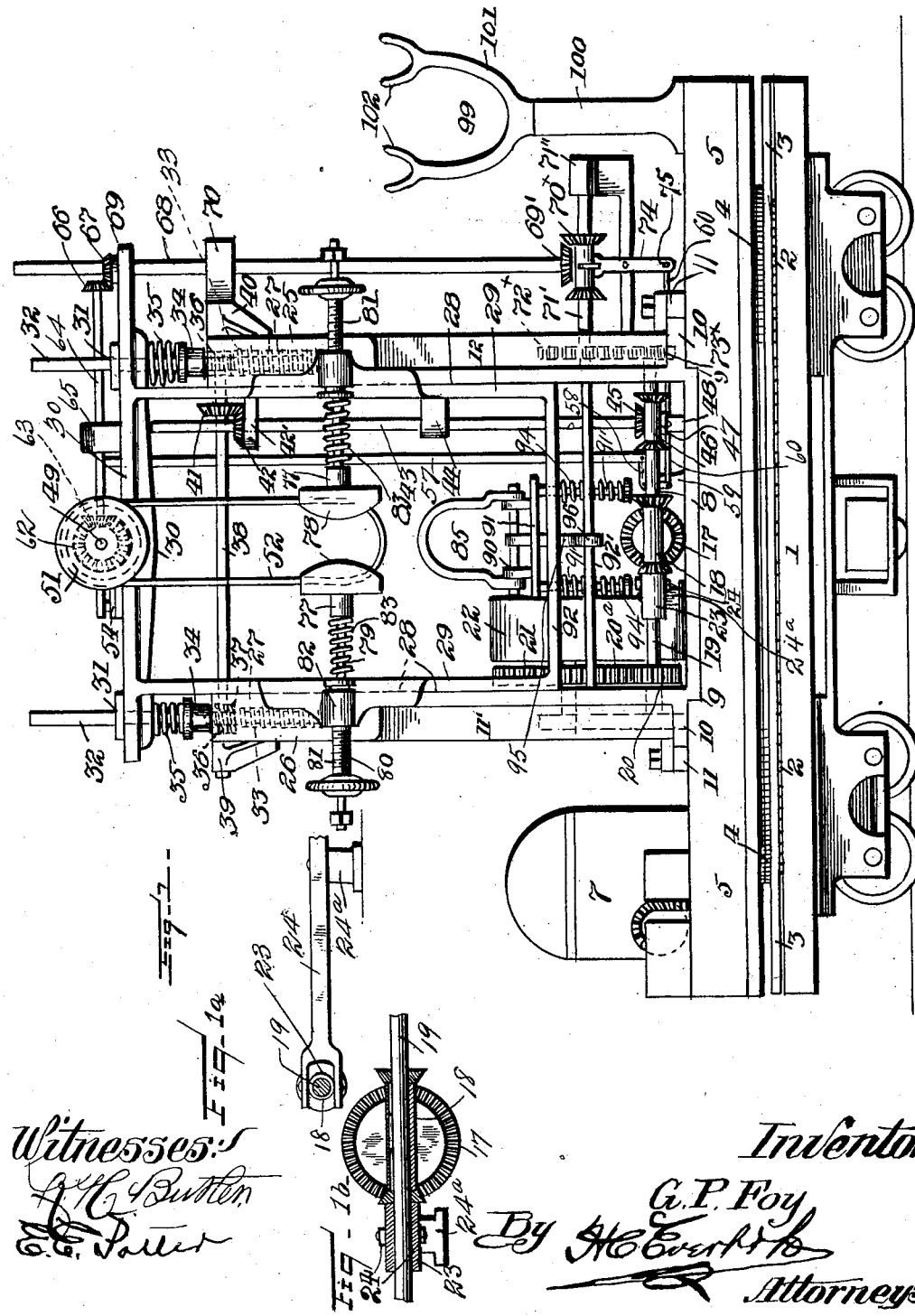

No. 749,049. PATENTED JAN. 5, 1904.
G. P. FOY, DEC'D.
L. FOY, ADMINISTRATRIX.
MACHINE FOR HANDLING INGOTS OR LIKE PIECES UNDER THE HAMMER.
APPLICATION FILED SEPT. 15, 1902.
NO MODEL. 5 SHEETS—SHEET 2.
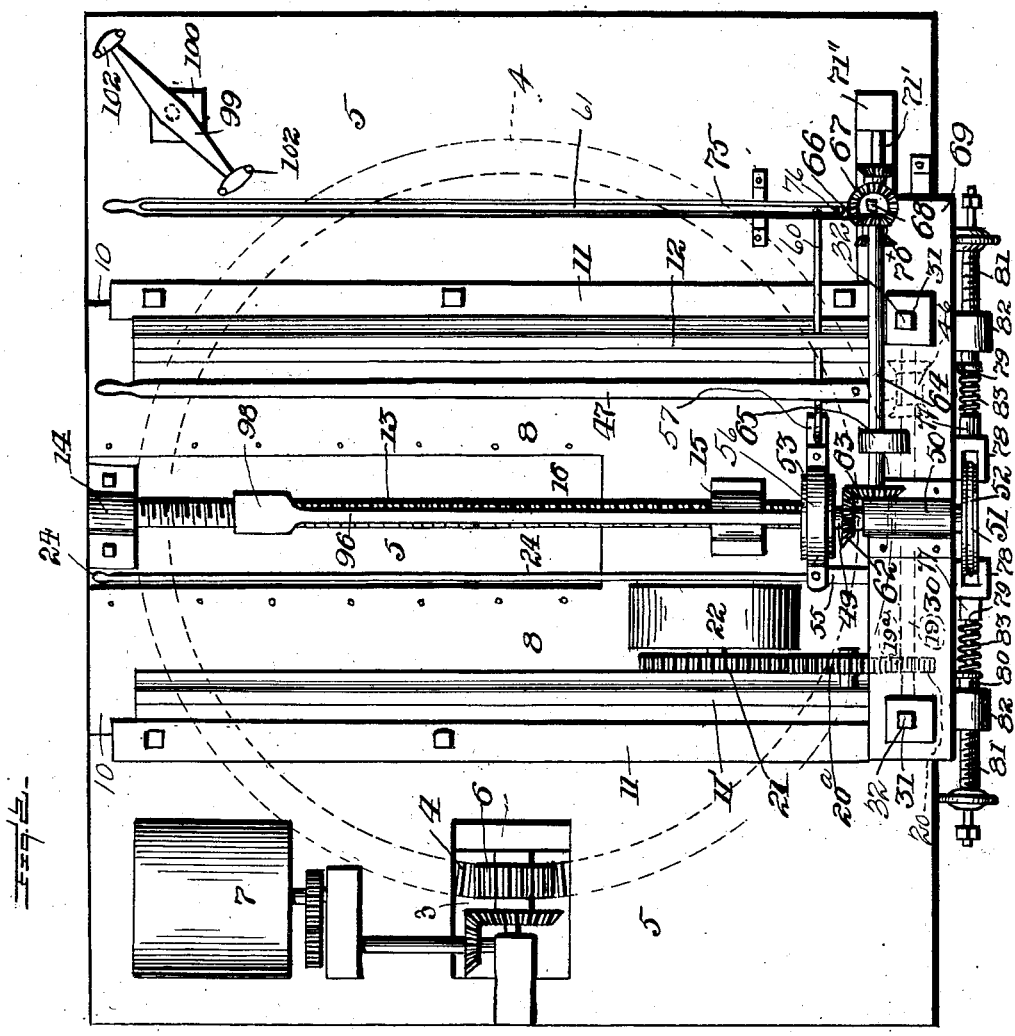

No. 749,049. PATENTED JAN. 5, 1904.
G. P. FOY, DEC'D.
L. FOY, ADMINISTRATRIX.
MACHINE FOR HANDLING INGOTS OR LIKE PIECES UNDER THE HAMMER.
APPLICATION FILED SEPT. 15, 1902.
NO MODEL. 5 SHEETS—SHEET 3.

WITNESSES:
W. F. Doyle
George Hilton

INVENTOR
G. P. Foy.
BY H. C. Evert & Co
Attorneys

No. 749,049. PATENTED JAN. 5, 1904.
G. P. FOY, DEC'D.
L. FOY, ADMINISTRATRIX.
MACHINE FOR HANDLING INGOTS OR LIKE PIECES UNDER THE HAMMER.
APPLICATION FILED SEPT. 15, 1902.
NO MODEL. 5 SHEETS—SHEET 4.
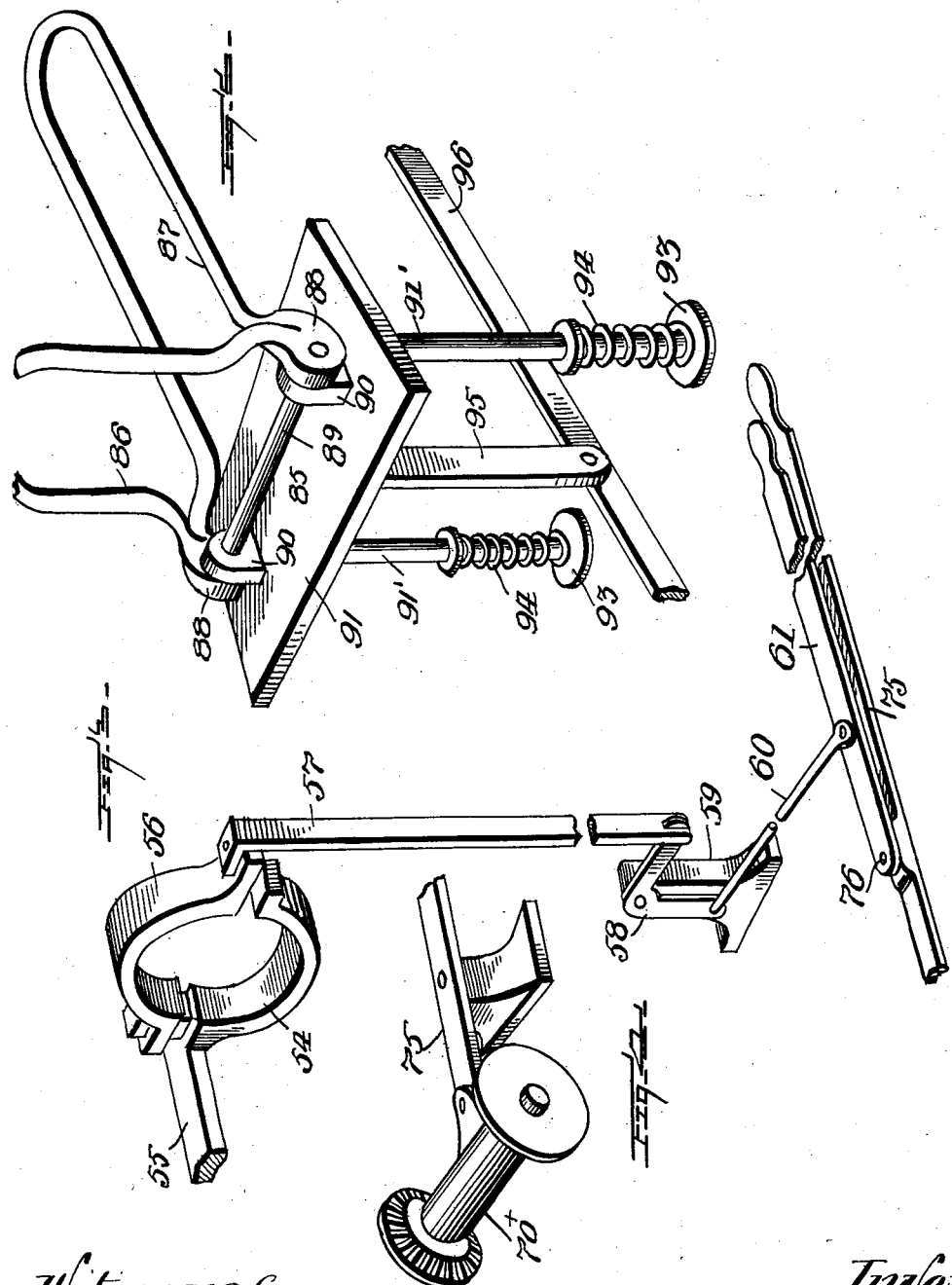
Witnesses:
Inventor,
G. P. Foy
By
Attorneys.

No. 749,049. PATENTED JAN. 5, 1904.
G. P. FOY, DEC'D.
L. FOY, ADMINISTRATRIX.
MACHINE FOR HANDLING INGOTS OR LIKE PIECES UNDER THE HAMMER.
APPLICATION FILED SEPT. 15, 1902.
NO MODEL. 5 SHEETS—SHEET 5.
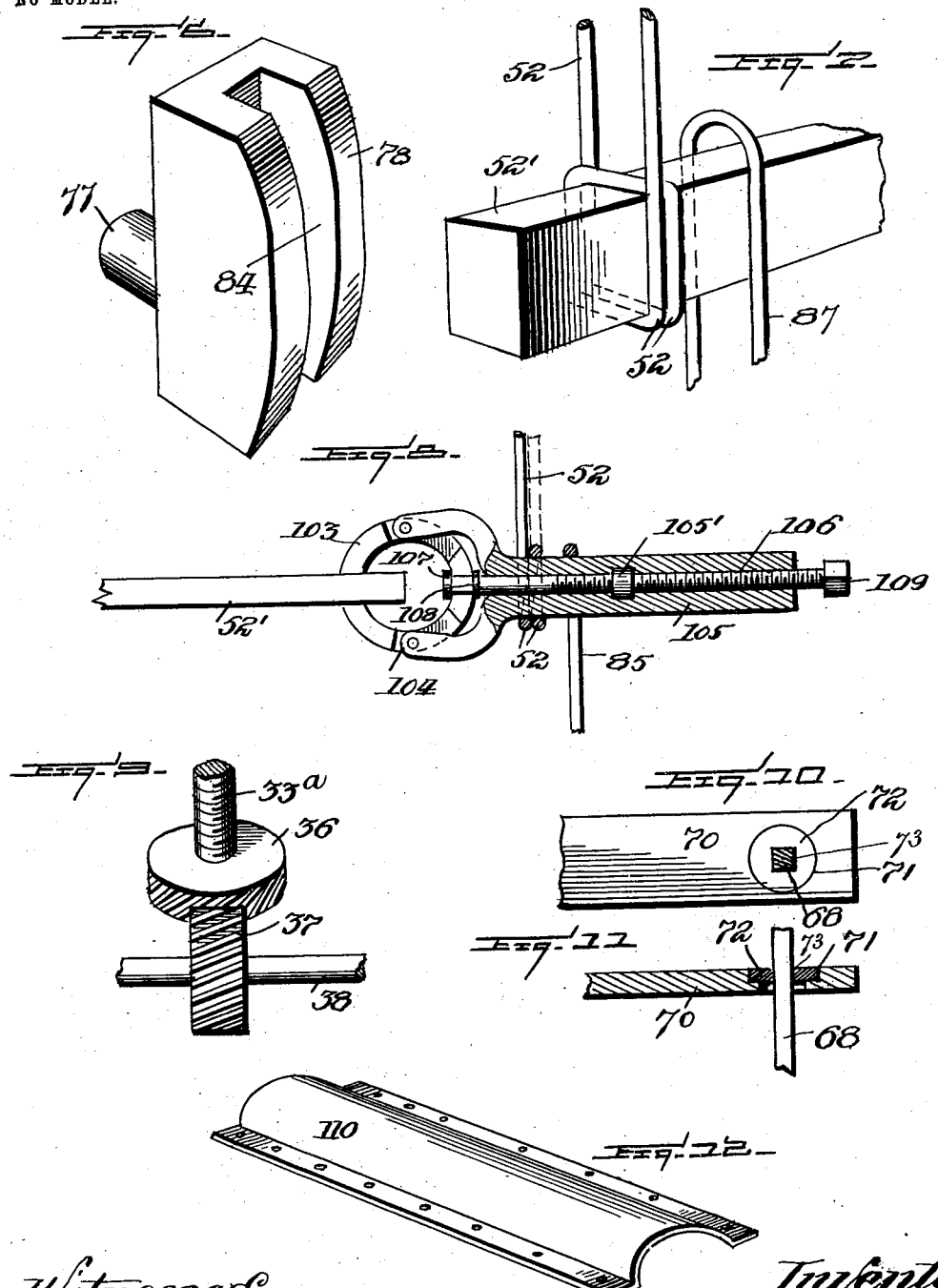

No. 749,049.

Patented January 5, 1904.

UNITED STATES PATENT OFFICE.

GEORGE P. FOY, OF HOMESTEAD, PENNSYLVANIA; LIZZIE FOY, ADMINISTRATRIX OF SAID GEORGE P. FOY, DECEASED, ASSIGNOR OF ONE-HALF TO ARTHUR NEILL, OF PITTSBURG, PENNSYLVANIA.

MACHINE FOR HANDLING INGOTS OR LIKE PIECES UNDER THE HAMMER.

SPECIFICATION forming part of Letters Patent No. 749,049, dated January 5, 1904.

Application filed September 15, 1902. Serial No. 123,537. (No model.)

*To all whom it may concern:*

Be it known that I, GEORGE P. FOY, a citizen of the United States of America, residing at Homestead, in the county of Allegheny and State of Pennsylvania, have invented certain new and useful Improvements in Machines for Handling Ingots or Like Pieces Under the Hammer, of which the following is a specification, reference being had therein to the accompanying drawings.

This invention relates to certain new and useful improvements in machines for handling ingots or pieces of material before and under a hammer, and more particularly to that class of machines whereby a piece of material may be manipulated so as to turn the same in any desired position.

The object of my invention is to construct a machine which may be actuated by any suitable means, said machine grasping and securing a piece of material in such a manner that the same may be readily moved to any position under the hammer.

My invention has for its further object to provide a machine which will obviate the necessity of manual handling of the piece of material, as well as constructing a device which will permit the piece to be readily straightened or hammered while in its highly-heated state.

Briefly describing my invention, I construct a machine which is mounted upon a traveling car, said machine having a revoluble and lateral movement upon the bed of the car. The machine comprises standards in which is slidably mounted a vertically-moving frame, the top of said frame carrying mechanism for gripping and turning the piece of material being handled by the machine.

To operate my improved machine, any kind of power may be employed, preferably electricity, and in the drawings I show electric motors for controlling the same. One of these motors I employ to revolve the machine upon the car, another to operate the car, while a third one is carried upon the baseplate of the standards, so as to operate the machine laterally by means of a screw-shaft and to raise and lower the frame which travels vertically in the standards and carries mechanism for turning the piece of material. These movements are controlled from a desirable and convenient position upon the machine or car by an operator who manipulates the machine, and by the reversing-gear and gearing to be hereinafter described it will be seen that a number of movements may be made simultaneously.

In describing the invention in detail reference is had to the accompanying drawings, forming part of this specification, wherein like numerals of reference indicate like parts throughout the several views, in which—

Figure 1 is a front view of my improved machine. Fig. 1$^a$ is a detail vertical transverse section of a reversing-gear. Fig. 1$^b$ is a detail vertical longitudinal section thereof. Fig. 2 is a top plan view of the machine. Fig. 2$^a$ is a side elevation thereof. Fig. 3 is a detail perspective view of the brake mechanism. Fig. 4 is a detail perspective view of a reversing-gear employed by me in my improved machine. Fig. 5 is a detail perspective view of the bails. Fig. 6 is a perspective view of one of the shoes. Fig. 7 is a fragmentary perspective view of a piece of material held by my improved machine. Fig. 8 is a side elevation of the tongs, partly in longitudinal section. Fig. 9 is a detail perspective view of the pinion and nut used to elevate the frame of my improved machine. Fig. 10 is a top plan view of one of the brackets. Fig. 11 is a section of the same, and Fig. 12 is a perspective view of the plate employed to cover the screw-shaft.

To put my invention into practice, I provide a traveling car, which may be operated by an electric motor, as shown in Fig. 1 of the drawings. This car is preferably rectangular in top plan view, and upon its upper face is an annular race for the reception of bearing-balls 2, and resting upon said bearing-balls 2 is a plate or platform 3, which has a race similar to the race upon the upper face of the car. Mounted on and secured by any suitable means upon the upper side of the plate 3 is a circular rack 4, upon which is supported and also travels the body portion or bed 5 of my improved machine, which revolves upon the rack by means of a pinion 6, journaled in the bed, said pinion meshing with the rack 4 and being geared to and operated by the motor 7, carried upon the bed 5 of the car. Countersunk at 9 in the bed 5 of the car and having a lateral movement therein is the base-plate 8, and formed integral with said base-plate are the side flanges 10, slidably held by means of the angle-bars 11, extending across the bed 5 of the car. Upon this base-plate 8 and formed integral with the same are the triangular standards 11' and 12, (shown in Fig. 2ª,) the altitude of these standards being in vertical alinement with one side of the machine when in its normal position, while the base of these standards extends lengthwise of the base-plate 8, as shown in Figs. 2 and 2ª. To move this base-plate 8, with the standards, across the machine, I provide a screw-shaft 13, which is mounted in bearings 14 and 15, the bearing 14 being mounted upon the bed of the car and a slot or cut-away portion 16 being provided in the base-plate 8 for the lateral movement of the latter, while the bearing 15 is carried by the base-plate 8. The screw-shaft 13 is threaded into the bearing 15 and turns in the bearing 14, and upon the forward end of said screw-shaft is secured a bevel-gear 17, said gear when in operation being meshed by a reversing-gear 18, carried upon the central operating-shaft 19, which is journaled between the standards 11' and 12.

Upon one end of the shaft 19 is secured a pinion 20, which is meshed by an idle pinion 20ª, which in turn is meshed by a pinion 21, carried by the central shaft of a motor 22, mounted upon the base-plate 8, whereby when the motor is put in operation the central shaft 19 will be rotated. To operate the reversing-gear at the desired time, I provide a collar 23, which is secured upon one end of the reversing-gear, and to this collar 23 is secured the operating-lever 24, which extends rearwardly across the machine to such a point as will be convenient to the operator and is mounted in a standard 24ª.

The triangular-shaped standards 11' and 12 carry enlarged portions 25 and 26 upon their upper ends and in the top of said standards, and extending downwardly into the enlarged portions thereof are the screw-threaded apertures 27. The object of said apertures will be hereinafter described. The inner sides of the standards 11' and 12 carry grooves 28, in which is slidably mounted a rectangular frame 29, the top of said frame carrying a cross-head 30, having formed in its outer ends squared apertures 31, through which are passed substantially square-shaped shafts 32, provided with screw-threads 33 upon their lower ends operating in the screw-threaded apertures 27 in the enlarged portions 25 and 26.

Between the cross-head 30 and the standards 11' and 12 I provide collars 34, which are formed integral with the shafts 32, and between said collars and the cross-head 30 I provide spiral springs 35. The object of said springs will be fully described in setting forth the operation. Directly beneath the collars 34 and abutting against the lower face of the same I provide nuts 36, said nuts being threaded upon the screw-threads 33 of the shafts 32, and upon the exterior of the nuts 36 I provide threads of great pitch, which mesh with worm wheels or pinions 37, the threads of which correspond in pitch to that of the threads on the nuts 36. These worm wheels or pinions 37 are carried by the shaft 38, journaled and resting in bearings 39 40, carried by the enlarged portions 25 and 26 of the standards 11' and 12, respectively. (See Figs. 1 and 2ª.)

Located upon the shaft 38, near the enlarged portion 25 of the standard 12, is a vertical bevel-gear 41, meshing with a horizontal bevel-gear 42, carried on a bracket 42', secured to the rectangular frame 29, and passing through said bevel-gear 42 and bracket is a vertical shaft 43, which has its support in a bearing 44, carried by the standard 12. Upon the lower end of this shaft 43 is arranged a bevel-gear 45, which is engaged by a reversing-gear 46 when in operation, said reversing-gear being also mounted upon the central operating-shaft 19 and operated by a lever 47, which is pivoted to a standard 48, mounted upon the base-plate 8, the lever extending rearwardly across the bed to such a position as will be convenient to the operator. It can be readily seen that through the operation of the reversing-gear 46, shafts 43 and 38, and worm-pinions 37 the frame 29 can be easily raised or lowered by the operator simultaneously with the lateral movement of the machine.

Upon the cross-head 30 I provide mechanism for supporting and turning the piece of material which is in use. This mechanism consists of a stub-shaft 49, journaled in a bearing 50, mounted centrally upon the cross-head 30, and upon the forward end of the shaft 49 I provide a sprocket or friction wheel 51, over which passes an endless chain or cable 52. This chain or cable supports and turns the piece of material in use, as will be described in the operation. To the rear end of the shaft 49 I secure a friction-wheel 53, upon which is actuated the brake which controls the movement of the piece of material. This brake, as shown in Figs. 2 and 3, consists of a semicircular seat 54, carried by a rearwardly-extending arm 55 of the cross-head 30, said seat surrounding the lower half of the wheel 53. Upon the arm 55 I provide another semicircular band 56, which surrounds the upper half of the wheel 53, said band 56 having its other end connected to a rod 57, which extends downwardly and is connected to a bell-crank lever 58, pivotally connected to a standard 59, mounted upon the base-plate 8. To the other end of the bell-crank lever is connected a rod 60, which extends transversely of the machine and is connected to an operating-lever 61, as shown in Figs. 2 and 2$^a$. Mounted between the bearing 50 and the wheel 53 is a bevel-gear 62, which meshes with a bevel-gear 63, secured to one end of the shaft 64, said shaft being mounted in a bearing 65, carried upon the upper face of the cross-head 30, and upon the other end of the shaft 64 is secured a bevel-gear 66, meshing with a bevel-gear 67, carried loosely upon a vertical square shaft 68. The bevel-gear 67 is supported upon an extension 69 of the cross-head 30, said extension being provided with an aperture through which and in which the square shaft 68 passes and can freely turn. This shaft 68 is supported by a bracket 70, carried by the enlarged portion 25 of the standard 12, said bracket being shown in detail in Figs. 10 and 11. This bracket, as shown in top plan view and longitudinal section, has an annular seat 71, in which rotates the collar 72, having a square aperture 73 formed therein, through which passes the square shaft 68. It can be seen by this arrangement that the shaft can be rotated, while the extension can slide thereon.

Upon the lower end of the shaft 68 I secure a bevel-gear 69', which meshes with a reversing-gear 70$^\times$ when in operation. This reversing-gear is mounted upon a shaft 71', journaled between the bracket 71'' and the standard 12, and upon the inner end of the shaft is secured an upper pinion 72$^\times$, which meshes with a lower pinion 73$^\times$, carried by the central operating-shaft 19, said lower pinion being mounted between the right-hand standard 12 and the reversing-gear 46. The reversing-gear 70$^\times$ is operated by an arm 74, which is pivoted to the bracket 71''. The lower end of the arm 74 is connected to a lever 75, (shown in Figs. 2 and 2$^a$,) said lever extending laterally across the bed of the car to such a point as will be convenient to the operator. Upon this lever 75 is mounted the lever 61, which controls the brake, said lever being pivoted, as indicated at 76, and extending in alinement with the lever 75.

It will be readily seen that by the gearing shown the piece of material being handled can be turned, raised or lowered, and moved laterally across the car by one motor—namely, the motor 22. To guide and steady the cable or chain are the guides 77, which are carried by the frame 29, said guides being located diametrically opposite each other and in horizontal alinement with the cable or chain. These guides consist of two shoes 78, one of said shoes being shown in Fig. 6. The shoes are secured to the inner ends of the shafts 79, carrying sleeves 80, which are exteriorly screw-threaded, as shown and indicated at 81. These sleeves are carried by the bearings 82, which are formed integral with the frame 29.

83 indicates spiral springs which surround the shafts 79, said springs bearing against the screw-threaded sleeves 80 and the shoes 78, respectively. These shoes are furnished with grooves 84, which are shown fully in Fig. 6, securing the chain or cable and performing the function of guides. By the use of the screw-threaded sleeves and spiral springs means are provided whereby the shoes can recede and be regulated at will.

Upon the lower beam of the frame 29 I mount two bails, as indicated at 85, said bails consisting of a large and smaller one, which are formed integral and at right angles to each other. At the angle 86 and 87 of these bails are formed the bosses 88, through which pass a rod 89, journaled in the bearings 90, carried by a plate 91, which carries downwardly-extending rods 91' from its under side, said rods passing through and held by the beam 92 of the frame 29. Upon the lower end of these rods are the caps 93, upon which is mounted the spiral springs 94, said springs surrounding the rods 91', the upper ends of the springs resting against the under face of the beam 92 of the frame 29, To the under side of the plate 91 I secure a lever 95, to the lower end of which I secure a rod 96, which extends laterally across the machine, said lever having its forward end pivoted, as indicated, to a cross-beam 92', mounted in the frame 29, while upon the outer end is arranged the step 98, which is used by the operator.

In the handling of material it has been found advantageous to provide a rest, as indicated at 99 and shown in Figs. 1, 2, and 2$^a$. This rest is preferably mounted upon one corner of the bed of the car convenient to the operation of the machine, said rest consisting of a standard 100, upon which are swiveled the bifurcated arms 101, having their upper ends formed U-shaped, as indicated at 102. When a piece of material is to be handled by the machine, it can be directly engaged by the chain or cable or laid upon the rest prior to the handling of the same.

In handling a small or short piece of material it has been found that in order for the piece to be placed under the hammer by the machine an extension would be necessary, for which I have provided, as shown in Fig. 8 of the drawings. This extension consists of a pair of tongs which grip the material, and to said tongs is attached the chain or cable of the machine. These tongs consist of a pair of gripping-jaws 103, which are pivoted in the bifurcated arms 104 of the shank 105 of the tongs. Threaded through an internal nut 105' in said shank is a rod or stem 106, which carries collars 107 and 108 at its forward end, and between said collars rests the rear end of the jaws 103. On the other end of said rod or stem 106 is formed a square head 109, used to turn the rod 106. It can be readily seen that by operating the screw-threaded rod inwardly the jaws 103 will be separated, and vice versa. When using this extension, it has been found advantageous to place the chain or cable and the bail in close proximity to the bifurcated arms 104, whereby the piece or material may be easily carried.

In Fig. 12 of the drawings I illustrate a curved plate 110, which is employed to cover the slot or cut-away portion 16 of the base-plate 8, thus preventing the operator from coming in contact with the screw 13 and entirely avoiding accidents therefrom.

The operation of my improved machine is as follows: Heretofore when a piece of material has been handled under the hammer it has been held by a crane or derrick and the piece manipulated by a workman, who guided and turned the piece as it was struck by a hammer. In this operation it has been found that a great many accidents occur to the workman by the piece under the hammer buckling and slipping, and considerable time is lost in replacing and handling the same. It being desired to shape a piece under the hammer, the same is placed in the loop, as shown in Fig. 7 of the drawings, and the bail 86 or 87 is placed over the outer end of the same. This piece is taken from the table carried by the rolls or may have to be taken from the rest 100, carried upon one corner of the machine. After the piece has thus been gripped by the machine the end of the piece to be shaped is placed under the hammer, and in performing this movement the rack 4 is brought into play by the operator who manipulates the machine. The motor 22 having been started which revolves the central operating-shaft 19, the reversing-gear 46 is thrown into engagement by means of the lever 47, said reversing-gear meshing with gear 45, carried upon the shaft 43, from whence motion is transferred to the shaft 38 through the gear 41. The shaft 38 in turn operates the shaft or rods 32, this being accomplished by pinion 37, carried on a shaft 38, said pinions meshing with nuts 36, which are exteriorly threaded and interiorly threaded, said interior threads meshing with threads carried on the shaft 33. As shown in Fig. 1, these nuts 36 carry collars 34, which are secured to the shafts 32, and upon the collar rest springs upon which bears the cross-head 30, said cross-head carrying square apertures 31, through which pass the square shafts 32. It will be seen by this gearing that the cross-head which supports the piece of material can be raised or lowered at will, carrying with it the bails 86 and 87 and the guides 78. In case a piece of material carried by the machine is not fairly struck or is struck a glancing or side blow with the hammer and one side of the cross-head 30 is depressed the springs 35 which I provide will take up this tension or depression and again return the cross-head to its normal position. Having raised or lowered the piece to the desired position, it being desirous to turn the same, the lever 75 is moved, throwing the reversing-gear 70 into gear with the pinion 69', carried on the lower end of the square shaft 68, said shaft being supported by a bracket upon which is the annular collar 72, which allows the square shaft to rotate. This shaft carries a loose pinion 67, which meshes with the bevel-gear 66, carried on the outer end of the shaft 64 on the cross-head 30 in a bearing 65. On its other end the shaft 64 carries the bevel-pinion 63, meshing with a gear 62, carried on the shaft 49, which is supported in a bearing 50, mounted on the cross-head 30'. The shaft 49 has a sprocket or friction wheel 51 secured on its outer end, and over said wheel passes an endless chain or cable 52, which supports the piece of material to be operated upon. In practice this chain or cable is looped around the piece 52', as illustrated in Fig. 7, in close proximity to the point where the bail 85 (to be hereinafter described) engages the piece. Through the medium of this last-described gearing it will be readily seen how a piece may be turned and, if desired, simultaneously with the raising and lowering of the frame 29.

I have provided novel means for continually keeping the vertically-moving frame 29 in gear with the vertical shafts 43 and 68, said means consisting of constructing brackets 42' and 69 upon the frame, said brackets supporting the loosely-mounted pinions 42 and 67, whereby when the frame is raised or lowered the pinions 42 and 67 will travel upon the square shafts 43 and 68 and be in continual engagement with the pinions 41 and 66. Upon the rear end of the shaft 49 I secure a friction-wheel 53, around which is mounted the friction-brake. (Shown in Fig. 3 of the drawings.) This brake is supported upon the cross-head and is operated by a lever 61, carried upon the lever 75, said lever 61 being connected to the brake by means of the bell-crank lever 58 and the connecting-rods 57 and 60. This brake is provided in case it is desired to check the movement of the piece from turning, as may be necessary in the manipulating of the machine.

It will be noted that I have shown two sizes of bails, and in case a large piece of material is to be handled by the machine the bail 87 is used to steady the rear end of the piece, and when found necessary the forward end of the piece can be tilted by means of the lever 96. This lever, as described, has its forward end pivoted on the rod 92', while it is connected to the plate 91 by means of the rod 95. By the operator stepping upon the step 98 the plate can be lowered, carrying the bail therewith, and the same is returned by the springs 94. (Shown in Figs. 1 and 5 of the drawings.) In the same instance the guides can be regulated by the turning of the screws 81, so that the shoes 78 may be adjusted to a width corresponding to the sides of the piece of material.

The motors employed by me to control and furnish power for the machine may be connected together from any source of supply, preferably from the motor carried by the car for operating the same. Any suitable switch may be used for controlling the current and throwing the motors into operation.

Having fully described my invention, what I claim as new, and desire to secure by Letters Patent, is—

1. In a machine for handling an ingot or the like, the combination, with a car, of a bed rotatably mounted thereon, a base-plate adapted to be moved across the bed, standards carried by said base-plate, a vertically-movable frame mounted so as to slide in the standards, means carried by the frame for holding the ingot or like piece of material, and means for controlling the vertical movement of the frame, substantially as described.

2. In a machine for handling ingots or like piece under a hammer, the combination with a rotatable bed, of a base-plate adapted to be moved across the bed, standards mounted on the base-plate, a vertically-movable frame, mounted so as to slide in the standards, means for operating said frame, means carried by the frame for holding the piece of material in position under the hammer, and means for rotating the bed, substantially as described.

3. In a machine for handling an ingot or like piece under a hammer, the combination of a rotatable bed, means for operating said bed, a base-plate adapted to be moved across the bed, standards mounted on said base-plate, a vertically-movable frame mounted so as to slide in said standards, means carried by the frame for holding the ingot or piece to be handled, and means for operating the vertically-movable frame, substantially as described.

4. In a machine for handling ingots or like pieces under a hammer, the combination, with a rotatable bed and means for rotating the same; of a vertically-movable frame mounted on the bed, means for operating and controlling the movement of said frame, a spring-pressed bail carried by the frame so as to engage the piece, and a chain or cable suspended from the frame for engagement with the piece to be handled, substantially as described.

5. In a machine for handling ingots or like piece of material under a hammer, the combination, with a rotatable bed and means for operating said bed; of a base-plate adapted to be moved across the bed, a vertically-movable frame mounted on the base-plate, means for operating and controlling said frame, and means carried by the frame for holding the piece of material while the latter is being operated upon by the hammer, substantially as described.

6. In a machine for handling a piece under a hammer, the combination, with a bed; of a base-plate adapted to be moved across the bed, standards mounted on the base-plate, a vertically-movable frame mounted in said standards, means carried by said frame to hold the piece of material in position under the hammer, and means for operating said frame, substantially as described.

7. In a device of the character described, the combination of a rotatable bed carrying a rest or support, of a base-plate adapted to be moved across the bed, standards mounted on said base-plate, a vertically-movable frame operating in the standards, means for operating said frame, and means carried by the frame to hold the piece of material being operated on by the hammer, substantially as described.

8. In a machine for handling a piece under a hammer, the combination, with a rotatable bed; of a base-plate adapted to be moved across the bed, standards slidably mounted on said base-plate, means for operating said base-plate to move the standards across the bed, a vertically-movable frame carried by the standards and operating therein, means for operating said frame, and means carried by the frame for holding the piece of material in position to be operated upon, substantially as described.

9. In a machine for handling a piece under a hammer, the combination, with a bed, of a base-plate adapted to be moved across the bed, standards mounted on said base-plate, means for operating said base-plate to move the same across the bed, a vertically-movable frame carried by the standards and operating therein, means for operating said frame, and means carried by the frame for holding the piece of material in position to be operated upon, substantially as described.

10. In a machine for handling a piece under a hammer, the combination with a bed, of standards slidably mounted on said bed, means for operating said standards to move the same across the bed, a vertically-movable frame carried by the standards, means for operating said frame, a chain or cable carried by the frame to engage and support the piece of material being operated upon, and guide-shoes for said cable or chain, substantially as described.

11. In a machine for handling a piece under a hammer, the combination with a rotatable bed, and means for operating said bed, of standards slidably mounted on the bed, means for operating said standards, a vertically-movable frame carried by the standards, means carried by said frame for supporting the piece of material to be operated upon, and means for controlling the last-named means for rotating the piece while being held, substantially as described.

12. In a machine for handling a piece of material under a hammer, the combination with a rotatable bed, and means for rotating the same, of standards mounted on said bed and slidable across the bed, a screw and gears for operating said standards, a vertically-moving frame having a cross-head, compression-springs arranged between the cross-head and the standards, means carried by the frame for holding the piece of material in position under a hammer, including a cable or chain for engagement with the piece, a wheel over which said cable or chain operates, and a brake for controlling the movement of said wheel, substantially as described.

In testimony whereof I affix my signature in the presence of two witnesses.

GEORGE P. FOY.

Witnesses:
A. M. WILSON,
R. A. RUESS.